United States Patent [19]

Siefert et al.

[11] Patent Number: 5,125,966
[45] Date of Patent: Jun. 30, 1992

[54] PROCESS FOR DE-OILING MILL SLUDGE

[75] Inventors: Kristine S. Siefert, Crete; Natalie R. Blake, Naperville, both of Ill.

[73] Assignee: Nalco Chemical Company, Naperville, Ill.

[21] Appl. No.: 630,846

[22] Filed: Dec. 20, 1990

[51] Int. Cl.$^5$ ............................................. C22B 3/00
[52] U.S. Cl. ...................................... 75/711; 75/962; 134/2; 134/10; 134/40; 210/108
[58] Field of Search ...................... 75/711, 962; 134/2, 134/10, 40; 210/708

[56] References Cited

U.S. PATENT DOCUMENTS

| | | | |
|---|---|---|---|
| 3,844,943 | 10/1974 | Duval | 210/67 |
| 4,091,826 | 5/1978 | Bahrke | 134/11 |
| 4,177,062 | 12/1979 | Pack | 75/28 |
| 4,288,329 | 9/1981 | Duval | 210/772 |
| 4,326,883 | 4/1982 | Schwarz | 75/5 |
| 4,585,475 | 4/1986 | Fosnacht | 75/51.2 |
| 4,738,785 | 4/1988 | Langston et al. | 210/738 |
| 5,047,083 | 9/1991 | Blake et al. | 75/711 |

FOREIGN PATENT DOCUMENTS

| | | |
|---|---|---|
| 1154595 | 10/1983 | Canada . |
| 80589 | 6/1983 | European Pat. Off. . |
| 2920379 | 12/1979 | Fed. Rep. of Germany . |
| 3043220 | 6/1982 | Fed. Rep. of Germany . |
| 3120463 | 10/1982 | Fed. Rep. of Germany . |
| 3146809 | 11/1982 | Fed. Rep. of Germany . |
| 3223011 | 6/1983 | Fed. Rep. of Germany . |
| 3232915 | 8/1984 | Fed. Rep. of Germany . |
| 51-33486 | 9/1976 | Japan . |
| 52-73181 | 6/1977 | Japan . |
| 52-93603 | 8/1977 | Japan . |
| 52-111492 | 9/1977 | Japan . |
| 56-79180 | 6/1981 | Japan . |
| 58-147524 | 9/1983 | Japan . |
| 61-183402 | 8/1986 | Japan . |
| 84183 | 3/1985 | PCT Int'l Appl. . |
| 82475 | 11/1982 | South Africa . |

OTHER PUBLICATIONS

Dewatering of Steel Mill Sludges by Belt-press Filtration, Patzelt et al., Proceddings of the 39th Ind. Waste Conf., May, 1984.

Recycling of Ferrous Steel Plant Fines, State of the Art, Fosnacht, Iron and Steel Maker, vol. 8, No. 4, Apr. 1981, pp. 22-26.

Treatment of Oily Wastes from a Stee Mill, Woods et al., Journal of Water Pollution Control Federation, vol. 45, No. 10, Oct. 1973.

Untersuchunger Zur Entoelung von Walzzunder, Supp et al., Technishche Mittellunger Krupp, Forschungsberichted, vol. 33, No. 3, Dec. 1975, pp. 89-92.

Characterization and Utilization of Iron Bearing Steel Plant Waste Materials, Fosnacht, Proc. Int'l Symp. Physical Chemistry of Extractive Metallurgy, AIME Annual meeting, Feb. 1988.

Removal of Organic from Recycled Materials, De Filippi, Conservation of Recycling, vol. 8, Nos. 3-4, 1985.

Steel Mill Residue Recycling Processes, Margolin, Conservation and Recycling, vol. 8, Nos. 3/4, pp. 359, 362, 1985.

Republic Steel Recycling 80% of Steel-mill Waste, Civil Engineering-ASCE, Jun. 1980, pp. 102-103.

Recycling of Steel Plant waste Materials, Ralph, Steel Times, vol. 204, No. 8, Aug. 1976, pp. 718-724.

Steel Industry Sludge is being Reused, Pat. Report, Env. Sci & Technol. 9(7), pp. 624-625.

Development of a Deoiling Process for Recycling Millscale, Harold, Recycling in the Steel Industry, Proc. Process Technol. 1st, 184-187, Iron Steel Soc. AIME.

How To Simplify Lube Oil System Cleanup, Martin et al., Maintenance, Hydrocarbon Processing, Jan. 1977.

Handhabung von Valzzunderschlammen, Kass, Ermetall, vol. 37, No. 6, pp. 302-305 1984.

Pollution Control and Upgading of Mineral Fines with Bitumen, Herment et al., Proc. Int. Symp. Miner. Environ., 1974, pp. 245-259.

Experience in the Use of Mill Scale in the Production of Acid Pellets, Fitzpatrick et al., Sym/Ser. Australas. Inst. Min. Metall., No. 7, 1974.

Use of Metal-Oil Scale in the Production of Keramzit, Knigina et al., Prom-st. Stroit. Mater. Ser. 11, 1981 (7), 6-8.

*Primary Examiner*—Melvyn J. Andrews
*Attorney, Agent, or Firm*—Joan I. Norek; Robert A. Miller; Joseph B. Barrett

[57] ABSTRACT

A process for de-oiling mill sludge employs the steps of admixing mill sludge with water and surface active agent to form a mill sludge slurry which is subjected to high shear agitation to form an oily water emulsion. Then at least 40 weight percent of the solids present in the mill sludge treated is separated from the oily water emulsion.

20 Claims, No Drawings

PROCESS FOR DE-OILING MILL SLUDGE

TECHNICAL FIELD OF THE INVENTION

The invention is in the technical field of industrial waste recovery, and in particular the de-oiling of steel mill sludge and like materials.

BACKGROUND OF THE INVENTION

Steel mill sludge is a waste material from the steelmaking process that contains iron oxide. Steel mill sludge, or "mill sludge", differs from mill scale generally in its finer particle size and higher oil content. During the steelmaking process, and particularly during the processes in the steel plant which occur after the blast furnace, streams of waste water that carry iron oxide waste material and oil contamination are generated, and generally flow into a pit. In such pit the material settles, forming three phases, i.e., an upper oil phase or layer, a lower layer of solids and a middle layer of water. Such lower layer of solids is generally referred to as mill scale. The water layer is pumped to a waste treatment area for separation of relatively clear water from the contaminants it contains. This water clarification area may be a settling basin, a clarifier, a drag-out basin or the like, and coagulants or other water clarification treatments may be used. The material that is separated from the water is referred to as mill sludge. The solids of the mill sludge are generally inherently much finer than the mill scale which originally settled from the waste stream because it is the finer particles that tend to remain in the water layer and tend to be carried away with the water layer when it is pumped from the pit. Mill sludge also generally has a higher oil content than mill scale, because the oil tends to become more associated with the finer solids than with the coarser particles of the mill scale.

The oil contamination is generally derived from the lubricants and coolants used in the manufacture of the final products as well as lubricants from the equipment exposed to elevated temperatures during the formation of the final steel products. Such oil contamination of mill sludge limits the potential for recycling the iron oxide containing sludge back into the steelmaking process. The heat involved in the steelmaking process liberates hydrocarbons and various oxides of hydrocarbons from oily substances, creating air contamination and making it difficult to meet environmental quality standards. In addition, if the material recycled to the sinter plant (which prepares the feed to the blast furnaces) contains too much oil, operational problems such as fouled fan blades and filter bags result, in addition to the problem of excessive hydrocarbon emissions.

If the mill sludge cannot be recycled back into the steelmaking process, then its iron oxide material becomes waste rather than being a useful raw material for steelmaking.

It is thus highly desirable to reduce the oil content of mill sludge to a suffcent extent so as to render the mill sludge suitable for recycling back into the steelmaking process. It is also highly desirable to so de-oil the mill sludge by economical means so that the advantages of recycling and reduction of waste matter are not severely diminished by the costs of such de-oiling. It is an object of the present invention to provide a method of de-oiling mill sludge to a sufficient extent so as to render the mill sludge suitable for recycling back into the steelmaking process. It is also an object of the present invention to so de-oil mill sludge in a reasonably economic manner.

DISCLOSURE OF THE INVENTION

The present invention is a process for de-oiling mill sludge which comprises admixing the mill sludge with sufficient water and sufficient surface active agent to provide a slurry having at least 25 weight percent solids content and at least 4,000 ppm of surface active agent based on solids, subjecting the slurry to high shear agitation to form an oily water emulsion, and separating at least 40 weight percent of the solids from the oily water emulsion. As an example of these minimum parameters, from 100 parts by weight of a slurry containing 25 weight percent solids (25 parts by weight solids), at minimum 10 parts by weight solids (40 percent by weight of the solids) would be separated from the oily water emulsion by the process. The present invention is also a process for de-oiling mill sludge which comprises subjecting mill sludge to the above process steps, and then repeating such process steps on the solids recovered from the oily water emulsion until the solids recovered have been reduced in oil content to the desired degree. The present process is also a process for de-oiling mill sludge which comprises the above process steps wherein at least a portion of the water and surface active agent are recycled to reduce costs.

PREFERRED EMBODIMENTS OF THE INVENTION

As noted above, the present invention is a process for de-oiling mill sludge. Mill sludge can be, and is herein, defined as that portion of waste material from a steelmaking mill which contains iron oxide solids and is recovered from the waste water after a first recovery of settled solids therefrom. In other words, mill sludge can be, and is herein, defined as a secondary recovery iron oxide containing material.

Mill sludge can also be, and is herein, defined as material containing iron oxide solids and having an oil content of at least 1.0 part by weight, and more commonly at least 5.0 or 10.0 parts by weight, oil per hundred parts by weight of mill sludge solids.

Mill sludge can also be, and is herein, defined as material containing iron oxide solids and having a content of fines, based on total mill sludge solids, of at least 10.0 weight percent, and more commonly at least 50.0 weight percent.

A mill sludge is a material within at least one, and more commonly within all, of the above definitions.

By "fines" is meant herein solids that pass through a 100 mesh sieve, which should be solids having a diameter of less than 149 microns (0.149 mm or 0.0059 inches).

The high mil content and/or high fines content of mill sludge make de-oiling of the sludge very difficult. The process of the present invention, in preferred embodiment, is directed to the de-oiling of mill sludges having high oil and fines content, such as mill sludges having at least 5.0 parts by weight oil per hundred parts by weight solids, and at least 20.0 weight percent fines based on total mill sludge solids. In more preferred embodiment, the present process is applied to mill sludges having at least 10.0 parts by weight oil and at least 30 weight percent fines, same bases as above.

In a typical mill sludge, iron oxide (as FeO) may comprise as little as 40 weight percent of the total mill sludge solids, although it is more common that the iron oxide (as FeO) comprise about 65 to 90 weight percent of the total mill sludge solids. Generally the proportion of recovered solids is commensurate with the proportion of iron oxide recovered after processing by the present invention.

One purpose of the present invention is to recover a reasonable proportion of the iron oxide in the mill sludge having a reduced oil content, generally either for additional de-oiling processing or for recycle back into the steelmaking process. While the recycling of mill scale generally requires that such mill scale contain no more than 0.5 weight percent oil, based on substantially dry mill scale, a higher oil content is acceptable in mill sludge deemed suitable for recycling. This greater tolerance for residual oil in recyclable mill sludge is due to its lower volume generally. A much greater amount of mill scale is generally recovered from the waste material of the mill, and if it is de-oiled to acceptable limits, the addition thereto of mill sludge solids with a greater oil content will not unduly increase the overall oil content of the waste iron oxide being recycled to the steelmaking process. In addition, if the recovered sludge is to undergo further de-oiling processing, either by the process of the present invention or by other process(es), an acceptable level of oil in the recovered material may be much higher than that considered acceptable for mill scale to be recycled back to the steelmaking process. Hence the present process is considered reasonably efficient if the oil content of the recovered material (recovered sludge) is no more than 10 weight percent, based on the total weight (including residual water and oil) of substantially dry recovered sludge, and more preferably no more than 5 percent same basis, and even more preferably no more than 2 percent same basis. ("Substantially dry recovered sludge" as this phrase is used herein, means recovered sludge containing no more that 5 weight percent water.) The present process is also considered reasonably efficient if the oil to total solids weight ratio in the substantially dry recovered sludge is no more than 60 percent of the oil to total solids weight ratio in the mill sludge charged to the process, and more preferably no more than 40 percent same basis, and even more preferably no more than 20 percent same basis.

Another aspect of the efficiency and practicality of the present process is the percentage of iron oxide recovered in a de-oiled or partially de-oiled state. As noted above mill sludge can have a fines content of at least 10.0 weight percent, and more commonly at least 20.0 weight percent, based on weight of the total solids. Mill sludges can have very high fines content, in fact up to 100 percent. Fines will tend to become entrained or otherwise associated with the oily water emulsion formed upon high shear agitation, and a portion of such fines will be lost to the "recovered sludge" when the recovered sludge is separated from the oily emulsion and rinsed. It has been found that such fines that are lost to the recovered sludge tend to have high oil contents and thus a further recovery of such lost fines from the oily water emulsion and rinse waters does not provide generally suitable material for recycling to the steelmaking process. Such lost fines therefore are generally deemed themselves waste material. Given the potential for extremely high fines content in mill sludge, the present invention may be deemed sufficiently efficient if the recovered sludge solids are at least 40 weight percent of the initial solids processed, and preferably at least 50 weight percent, same basis. In most preferred embodiment, the recovered sludge solids are at least 60 weight percent of the initial solids processed. The present process may also be deemed sufficiently efficient if no more than 70 weight percent fines of the initial sludge are lost to the recovered sludge, and preferably if no more than 55 weight percent of the fines of the initial sludge are lost to the recovered sludge. In most preferred embodiment, the present process is sufficiently efficient if no more than 45 weight percent of the initial fines are lost to the recovered sludge.

The present invention is advantageously employed to reduce the oil content of typical mill sludge, regardless of whether the mill sludge is a secondary recovery iron oxide containing material from steelmaking mill waste, or whether the mill sludge is material containing iron oxide and having an oil content and/or fines content as decribed above. The advantages of the present invention are believed more pronounced, in comparison to other de-oiling methods, when the mill sludge's oil and/or fines content are high, even though one or more of the performance parameters decreases with increasing oil and/or fines content.

The term "high shear agitation" as used herein means that agitation which can be achieved by exposing the sludge slurries to high shear mixing conditions, such as a propeller tip speed of at least 1350 feet per minute, preferably at least 1500 feet per minute, and most preferably at least 1750 feet per minute, when the slurry solids are at least 25 weight percent of the total slurry, depending on equipment size. The high shear agitation is preferably accomplished where dual propellers are reverse pitched in a cell, or vessel, and provide interparticle contact in the slurries.

In large scale equipment, a suitable device for the high shear agitation is a device referred to as the Denver Attrition machine, which was originally designed for scrubbing sand at densities of 70 to 80 percent solids. Other operations for which this Denver Attrition machine has been used include the removal of iron stains from glass sands, the disintegration of clay balls and bituminous matter, the liberation of mineral values that may occur as slime coatings on sand grains, the separation of sand grains from cementing materials, and other high energy, density intense conditioning of other compounding formulations. The Denver Attrition machine consists generally of support structures, drive mechanisms, propeller shafts, dual propellers, tanks and cell partitions and may be operated in multiple series operations, either continuously or batchwise, wherein the motors, shafts and propellers, either low pitch and/or high pitch, operate in a cell which cells may be connected by series one with the other until a series of 6 to 8 consecutive cells, or more, has been achieved. The Denver Attrition machine provides for an extremely intense scrubbing zone in each cell between two large oppositely pitched propellers. The Denver Attrition machines are manufactured by the Denver Equipment Company located in Colorado Springs, Colo.

In practice, each cell of the Denver Attrition machine is designed so that a difference in the degree of pitch between propellers gives direction to the movement of the slurries being treated, advancing the slurry mass form cell to cell through the Attrition machine until the scrubbing operations are complete. In connecting cells flow is alternately down and up in adjacent cells, eliminating short circuiting and assuring full contact time of the slurry in the highly energy intense scrubbing zones with high shear motion. The high efficiency of mixing is due in part to the machine's efficient circulation of high solids material. The device is claimed to provide maximum particle contact per unit of horsepower input.

Other commercial devices that provide similar energy of mixing may also be used in the process of the present invention, such as devices manufactured by Eagle Ironworks, Des Moines, Iowa, by DeDietrich, Union, N.J., and by others.

The Denver Attrition machines provide an extremely intense scrubbing zone in each cell between two oppositely pitched propellers, and particles scrubbed therein are forced to impinge on each other and thereby, in combination with the action of surface active chemicals, clean themselves. In the operation of the present invention, employing a large scale device such as the Denver Attrition machine or a small scale device such as that described in the "Simulated De-oiling Method" below, it is believed that the particles of the slurry are exposed to such shearing forces that the oil held on the surfaces of the particles is partially or completely removed from those surfaces and is either suspended, emulsified, dispersed, or dissolved to a great extent in the water, or water and surface active agent combination, of the sludge slurry processed. The high efficiency of the process is in part dependent on the relatively high solids contents of the slurries. As noted above, the slurry being treated at minimum should have a solids content of 25 weight percent, with 80 weight percent solids content as a maximum. In preferred embodiment the sludge slurry should have a solids content of from about 35 to about 75 weight percent, and more preferably from about 40 to about 70 weight percent. It is most preferred to operate with mill sludge slurries having solids contents of from about 50 to about 65 weight percent.

Energy imput in preferred high shear agitation devices of the continuous process type ranges from about 450 to about 4200 joules per pound of mill sludge slurry. In a batch operation, the typical energy imput would range from about 2.0 to about 14.0 horsepower per cubic foot of mill sludge slurry, depending on equipment size. The geometry of the mixing vessel also affects the energy imput and the extent of oil removal. A smaller gap between the impeller and the side of the vessel provides a zone wherein the sludge sees a higher energy imput (greater shear). Between two processes run at the same mixing rpm, same chemical dosage and same slurry solids for the same time period, the one having a smaller gap between the impeller and sides of the vessel will achieve a higher degree of oil removal, demonstrating the dependency of the efficiency of oil removal on the high shear agitation employed by the present process.

The duration of the high shear agitation of the sludge slurry may vary from about 5 to about 120 minutes. As will be demonstrated in the Examples below, the extent of oil removal from the mill sludge increases with both the duration and the level of high shear agitation. The amount of fines lost to the recovered sludge, however, is also increased with increasing shear and agitation time and, as noted above, the degree of shear increases with increasing slurry solids content. Hence the optimization of the present process in terms of both the reduction of oil in the recovered sludge and the minimization of fines lost to the recovered sludge, while minimizing processing time, may require selection of most, if not all, of the energy parameters from the preferred medium ranges. As to the duration of high shear agitation, a preferred time range is from about 5 to about 90 minutes, and more preferred is from about 10 to about 60 minutes. A very preferred combination of parameters is a process temperature (discussed further below) of from about 20° to 75° C., and a high shear agitation duration of from about 10 to about 90 minutes, and more preferably from about 10 to about 30 minutes.

The high shear agitation may be conducted at a wide range of slurry temperatures, for instance at a range of from about 1° to about 99° C., and preferably from about 10° to about 80° C., and more preferably from about 20° to about 75° C. The post-agitation rinses, discussed in more detail below, may be conducted using water at a temperture within any of the temperature ranges noted here for the slurry during high shear agitation. While temperature is also an energy parameter, the overall effect of the temperature may be dependent at least in part with the effect of the temperature on the solubility characteristic(s) of the surface active agent(s) employed. Nonionic surface active agents having ethylene oxide, propylene oxide or a mixture of ethylene oxide and propylene oxide chains have cloud points that may be exceeded by the high shear agitation temperature, and if this occurs it is believed that the surface active agent(s) become preferentially associated with the oil, and further when the temperature is then lowered the association of the surface active agent(s) with the oil promotes the formation of an oil-in-water emulsion, improving the removal of the oil from the solid surfaces.

One difficulty in de-oiling mill sludge is that such sludge normally contains a number of different types of oily materials, such as hydrocarbonaceous oils, oxidized and partially oxidized lubricants, hydraulic fluids, greases, gear oils, turbine oils, circulating oils, rolling oils, animal fats, synthetic fats, transmission and crank case oils, cutting oils, glycols and glycol esters and ethers, organic acids, organic esters, silicone oils, and the like.

At times a portion of the oily contaminants in mill sludge may be removed by decantation off the top of the mill sludge or by water washing of the mill sludge. Hence the process of the present invention may include the preliminary step of decanting a portion of the oil from the top of the mill sludge, alone as an optional step or together with, optionally, prior to the high shear agitation of the sludge slurry, a water washing of the sludge including the low energy slurrying of the mill sludge in water, followed by a phase separation of the slurry into a partially de-oiled mill sludge phase and an oily aqueous phase, the oily aqueous phase then being at least partially removed from the mill sludge phase. The term low energy slurrying means the use of sufficient energy to maintain the slurry in suspension and prevent, at least for some time period, the settling out of solids from the slurry.

The high oil content, and possibly also the high fines content, of typical mill sludge makes the use of a surface active agent ("chemical surfactant" or "surfactant") generally highly desirable, and it is believed that when the oil content of the mill sludge is 5 parts per hundred parts of mill sludge solids, weight basis, or higher, and/or when the solids therein contain 20 weight percent or more of fines, an appropriate surfactant should be present in the slurry during high shear agitation in the amount of at least 4,000 ppm based on slurry solids, and preferably in the amount of at least 10,000 ppm, same basis. A maximum level of surfactant needed for typical mill sludges is about 90,000 ppm, and a preferred range of levels of surfactant is from about 4,000 to about 90,000 ppm, and more preferably from about 10,000 to about 70,000 ppm, same basis.

An appropriate surfactant is capable of dispersing or dissolving in water at least a portion of the oil contained in mill sludge, and is not significantly retained on the surfaces of the recovered sludge after water washing.

An example of surfactants useful for the present invention are nonionic surfactants that are ethylene oxide adducts of alkyl phenols. When nonionic surfactants of such type or other types are employed, such surfactants preferably are of the type having HLB's of from about 6 to about 20, and preferably either have an HLB of from about 8 to about 15, or are used in blends of two or more surfactants which blends have a weight average HLB of from about 10 to about 15, although the HLB of one or more of the surfactants in such blend may individually be outside of such HLB range. Such blends, particularly blends formed of surfactants with widely diverse individual HLB's, is a preferred embodiment of the invention.

The chemical surface active agents employed in the following Examples or mentioned below are nonyl phenoxy polyoxyethylene ethanols commercially available under the following tradenames, and having reported HLB's as indicated in parenthesis following the tradename: Igepal CO 430 (8.8); Igepal CO 530 (10.8); Igepal CO 630 (13.0); and Igepal CO 730 (15.0). Igepal is a registered trademark of the GAF Corporation.

The HLB of a surface active agent is the Hydrophilic-Lipophilic Balance thereof, as defined in "Emulsifiers and Detergents", 1984 Annuals, published by McCutcheon's Division, MC Publishing Company, New Jersey, the contents of which are incorporated hereinto by reference.

The above identified Igepal CO surfactants are designated hereinafter as respectively surfactants B, C, D and E. The use of these surfactants in the following Examples, although preferred embodiments of the present invention, does not exclude the use of other nonionic surfactants or anionic or cationic surfactants.

By the term phase separation or phase separating is meant the separation of a phase that contains a significant proportion of solids from a phase that contains a significant proportion of liquids or fluids. Phase separation may be accomplished simply by settling in a settling tank, permitting recovery of solids, which tend to settle to the bottom, from the liquids which tend to rise to a phase above the settled solids. Other phase separation techniques include, but are not limited to, filtration, centrifugation, decantation and magnetic separation. A preferred post-agitation phase separation technique of the present invention is filtration, which in the Examples below is conducted at times while the sludge slurry, or at least a major portion of the solids thereof, is held on a mesh sieve and/or within a Buchner funnel, with a plurality of water rinses. On a commercial scale it would be preferred to pump the post-agitation slurry onto a moving belt filter, which filter may be an iron, steel or other metallic screen, or a plastic mat or felt or fabric, which provides for either gravity filtration or vacuum filtration, the liquid portion of the slurry, generally with an amount of fines, flowing through the filtration means and the solids being retained on top of the filtration means. Water rinses of the material retained on top of the filter means is again preferred, and such a filtration belt should be equipped with a means for collecting both the portion of the slurry that passes through the filtration means and the portion retained on top. In the process as practiced preferably, the portion of the slurry passing through the filter belts is collected in collection vessels, tanks, tubes, troughs, or the like and are further treated, for instance by centrifugation or the like, to remove a substantial portion of the fines and oil therein, the remainder being recycled back into the present process to be used as the dilution fluid, preferably together with an additional amount of fresh surfactant. The portion collected on the belt preferably is either reslurried for further de-oiling processing, or if sufficiently de-oiled is dried and sent to the sinter plant for the formation of sinter to be recycled into the steelmaking process and the blast furnace.

Particularly for high oil content mill sludge a significant amount of rinse water is preferably employed during the phase separation after the high shear agitation and to rinse the recovered sludge before collecting and drying. An amount of rinse water for post-agitation processing preferably is from about one to about five times the amount of mill sludge processed, on a weight basis, and more preferably from about two to about four times the amount of mill sludge processed, same basis. The rinse water initially employed will generally have a high content of fines and oily water emulsion, while the rinse water later employed will have less fines and oily emulsion, and it is preferable to collect fractions of the rinse water employed, so that no fraction will require an undue amount of post-collection treatment to render it suitable for recycling as slurry dilution water.

In Examples 1 to 31 below, the processing of mill sludge by the process of the present invention is demonstrated using a batch process method, and the typical method of separating de-oiled solids from the oily water emulsion is phase separation by filtration, although in at least Examples 24 through 26 an initial phase separation by decanting the fluid portion from quickly settling solids is employed. In Examples 24 through 26 there is also demonstrated the advantages of recycling the fluid phase back into the process for use as the dilution water, after removal of most of the fines therefrom by centrifugation. Upon recycling the fluid decanted from the post-agitation sludge slurry, only a small addition of fresh surfactant is required for the subsequent processing of a mill sludge sample.

The process of the present invention may also be conducted as a continuous process, preferably with some surfactant-containing fluid recycling.

The detailed steps of a batch operation employing the process of the present invention may be expressed as follows:

1. Slurry the mill sludge with water to obtain a mill sludge slurry having at least 25 weight percent solids and admix surfactant with such slurry;

2. Subject the mill sludge slurry to high shear agitation;

3. Substantially separate the fluid phase from the solid phase of the post-agitation mill sludge slurry, optionally diluting such slurry with water before or during such separation;

4. Rinse the solid phase recovered in Step 3 and further separate the solid phase from the fluid phase; prior to Step 1, the mill sludge may be analyzed, if necessary, for water content and oil content. The fluid phase separated during Step 3 may be recycled to use as the dilution fluid in Step 1. Such fluid will contain a significant amount of surfactant. Since it will also generally contain a significant amount of fines, it is preferable to subject the fluid to further phase separation treatment before recycling, for instance by centrifugation to separate and remove the fines and any oil associated with the fines. The waste rinse water of Step 4 may optionally also be recycled, and it may contain some measure of surfactant. The solid phase recovered in Step 4 may be dried and transferred to the sinter plant as sinter plant feed for recycling to the steelmaking process. Another alternative is to further de-oil the solid phase recovered in Step 4, either by recycling the solids back to Step 1 of the present process or transferring the solids to another de-oiling process.

The same format would substantially be employed in a continuous process with optional recycling of the fluids separated in Steps 3 and/or 4, and also optionally recycling that portion of the solid phase recovered in Step 4 that has too high an oil content back to Step 1.

SIMULATED DE-OILING METHOD

A laboratory scale de-oiling method which simulates a process suitable for de-oiling mill sludge on an industrial scale was conducted as follows. A batch of mill sludge from an industrial steel mill facility is analyzed for the weight percentage of oil therein, and optionally for the weight percent of water. A sample of the mill sludge from such batch is taken, weighed and then placed into a stainless steel vessel equipped with one or more internal baffles to augment agitation. The vessels employed in the following Examples are described in more detail below. The vessel is wrapped in electrical heat tape connected to a temperature controller to provide temperature control of the vessel contents during processing. Water of a standard formulation(s), described below, is added to the vessel at an elevated temperature (about 160° F. or 71° C.) to facilitate maintaining the contents temperature during processing. This added water, or dilution water, further contains the chemical surface active agent, or blend of surface active agents, to be employed in the given process. The amount of surface active agent(s) used is reported in the specific examples in terms of concentration in parts per million (ppm), based on the weight of the solids in the mill sludge sample used. In other words, a dosage of 50,000 ppm of surface active agent would represent 50,000 parts by weight of the surface active agent per 1,000,000 parts by weight of the solids in the mill sludge sample selected. The vessel is then equipped with an impeller described below. The standard processing parameters are mixing at 1350 rpm for a 15 minute time period while maintaining the vessel contents at a temperature of from about 50° to about 55° C., and any variations from these parameters are noted in the specific Examples. After such high shear agitation the vessel contents are transferred to a 200 mesh stainless steel screen to permit the fluids to drain therefrom, which fluids typically include some entrained fines. While on the screen the material is rinsed with four 200 ml. portions of standard formulation water. For each rinse, the water is poured onto the material and worked through with a rubber spatula. After such on-screen rinses, the material retained on the screen is transferred to a Buchner funnel equipped with a sheet of coarse filter paper. 400 ml. of the standard formulation water, in a squirt bottle, is used to achieve a substantially complete transfer. The two additional rinses of 200 ml. of the water are passed through the material, and vacuum is applied until the material appears substantially dry. It has been determined by water removal using a Dean Stark trap that the amount of water remaining in such type of material after vacuum is applied as noted above is from about 2 to about 4 weight percent. The material in the Buchner funnel, referred to generally as the recovered material or the recovered sludge, is then weighed an the oil content thereof is determined. Again, any variations of this method are expressly noted below in the specific Example(s) employing such a variation.

THE VESSEL

As noted above, the geometry of the vessel and/or impeller employed affects the degree of shear seen by the slurry being processed. The impellers used in the following Examples were six bladed turbine props. Each vessel was equipped with three internal baffles, the baffles being disposed in vertical positions, equidistant from one another and each extending toward the center of the vessel. Three combinations of vessels and impellers were employed in the Examples, which combinations are referred to hereinafter as Vessels A, B and C respectively, the geometries of which are set forth below in Table 1.

TABLE 1

| Parameter | Vessel A | Vessel B | Vessel C |
|---|---|---|---|
| Vessel Diameter (inches) | 4.125 | 4.0 | 5.0 |
| Number of Baffles | three | three | three |
| Baffle Extent (inches) | 0.375 | 0.3 | 0.5 |
| Impeller Diameter (inches) | 2.5 | 2.5 | 3.0 |
| Distance Between Impeller Tip and Vessel Wall (inches) | 0.81 | 0.75 | 1.0 |
| Distance Between Impeller Tip and Baffle Tip (inches) | 0.44 | 0.45 | 0.5 |

STANDARD FORMULATION WATER

The standard formulation water used in the Simulated De-oiling Method is a simulated process water prepared to simulate tap water available in Chicago, Ill. Two formulations were employed in the Examples, differing in the level of hardness but having the same alkalinity. These standard formulation waters, referred to hereinafter as water formulation 1 and 2 respectively, have the formulations shown below in Table 2.

TABLE 2

| Component | Water Formulation 1 | Water Formulation 2 |
|---|---|---|
| Deionized Water | 250 gallons | 250 gallons |
| $CaCl_2$ | 208.5 grams | 125.1 grams |
| $MgSO_4$ | 174.8 grams | 116.5 grams |
| $NaHCO_3$ | 174.9 grams | 174.9 grams |

THE MILL SLUDGES

The processes demonstrated in the following Examples used mill sludge samples from two separate batches, identified hereinafter as mill sludge X and Y respectively. Both batches were from a northeastern United States steel mill. Mill sludge X is comprised of 5.6 weight percent water, 16.3 weight percent oil and 78.1 weight percent solids. Mill sludge Y has a somewhat lower oil content, that is about 12 weight percent oil, and its appearance indicated that the water content was comparable to that of mill sludge X.

AMOUNT OF SLURRY PROCESSED

Unless indicated otherwise in the specific Example(s), the mill sludge was diluted to provide a sludge slurry containing about 50 weight percent solids, and the amount of this sludge slurry processed in a given Example was about 600 grams.

REPORTED RESULTS

Unless indicated otherwise in the specific Example(s), the results of a process are reported as percent recovered sludge and oil content of the recovered sludge. The percent sludge recovered is the weight of the substantially dry recovered material divided by the weight of the mill sludge sample charged (before dilution), multiplied by 100. The oil content of the recovered sludge is the weight % of the oil in the substantially dry recovered material, based on total weight of such recovered material. The following is an example of the conversion of such reported results to some of the other parameters mentioned above. The following theoretical compositions are used for this example.

| Mill Sludge Sample | Recovered Sludge |
|---|---|
| 100 parts by weight charged | 75 parts by weight recovered. |
| 5 wt. percent water | 4 wt. percent water |
| 15 wt. percent oil | 6 wt. percent oil |
| 80 wt. percent solids | 90 wt. percent solids |

The recovered sludge contains 90 parts by weight of solids, which is 67.5 parts by weight (90% of 75 parts), or 84.4 percent, of the 80 parts by weight of solids (80% of 100 parts) in the initial sludge sample; this recovery of solids is well within the preferred range of at least 60 percent. The oil content of the recovered sludge is 6 weight percent, and is within the preferred range of no more than 10 wt. percent. The recovered sludge oil to solids weight ratio of 0.067 (6/90) is 5.6 percent of that in the initial sludge (15/80 or 0.188), and this oil to solids parameter is within the more preferred criteria that the oil to solids weight ratio of the recovered material be no more than 40 percent that of the initial sludge.

The above example demonstrates the simple computation(s needed to convert the data as reported in the following Examples to the various criteria by which the present process is deemed reasonably efficient.

PROCESS PARAMETERS EMPLOYED

In Table 2 below there is set forth for each of the following Examples, identified by Example number, the variable processing parameters employed, including the Vessel, the standard formulation water, and the mill sludge batch.

TABLE 2

| Examples | Vessel | Water Formulation | Mill Sludge Batch |
|---|---|---|---|
| 1 to 11 | A | 1 | Y |
| 12 to 21 | B | 1 | Y |
| 22 to 31 | C | 2 | X |

EXAMPLES 1 TO 3

Three mill sludge samples were processed according to the Simulated De-oiling Method, as described above, employing a total of 50,000 ppm of surfactant in each. The surfactant(s) used are identified in Table 3 below, together with the data indicating the results.

TABLE 3

| | Example No. | | |
|---|---|---|---|
| | 1 | 2 | 3 |
| | | Surfactant(s) | |
| | C | C & D | B & D |
| Percent Sludge Recovered (wt %) | 71.2 | 76.3 | 76.5 |
| Oil Content of the Recovered Sludge (wt. %) | 4.91 | 4.60 | 4.23 |

In Example 2, the surfactant blend was 50/50 by weight, having a weight-average calculated HLB of 11.9. In Example 3, the surfactant blend was 25/75 by weight, having a weight-average calculated HLB of 11.9. The surfactant blend of Example 3 has a wider range of individual HLB's.

EXAMPLE 4

The mill sludge sample was processed according to the Simulated De-oiling Method, using 50,000 ppm of Surfactant C, except that the rpm employed for the high shear mixing was increased from 1350 rpm to 1800 rpm. The weight percentage of sludge recovered was 68.9 percent, and the oil content of the recovered sludge was 3.53 wt. percent.

EXAMPLE 5

The mill sludge sample was processed according to the Simulated De-oiling Method, using 50,000 ppm of Surfactant C, except that the rpm employed for the high shear mixing was increased to 2100 rpm. The weight percent of sludge recovered was 70.3 percent, and the oil content of the recovered sludge was 4.22 percent.

Comparing Examples 1, 4 and 5, which differ only in increasing rpm's, it is believed that the higher oil content result of Example 5 versus Example 4 was due to the slurry bouncing in the vessel at such speed, resulting in poor contact between the slurry and the impeller, a phenomena which would not occur in an industrial Attrittor. Thus it is believed that on an industrial scale the higher mixing rpm represented by Example 5 would result in a lower oil content in the recovered sludge in comparison to the mixing speed represented by Example 4.

EXAMPLE 6

One mill sludge sample was processed according to the Simulated De-oiling Method, employing 50,000 ppm of surfactant C, except that after the high shear mixing at 1350 rpm for 15 minutes, the vessel contents were diluted with 300 ml. of standard formulation water and subjected to an additional mixing at 700 rpm for 5 minutes before transfer onto the screen. The on-screen rinses were reduced to three, and otherwise the separations and recovery were as described in the Simulated De-oiling method. The percent sludge recovered was 79.0% and the oil content of the recovered sludge was 6.49 weight percent.

EXAMPLE 7

One mill sludge sample was processed according to the Simulated De-oiling Method, employing 50,000 ppm of surfactant C, except that after the high shear mixing at 1350 rpm for 15 minutes, the liquid in the mixing vessel was first decanted off onto the screen, the remaining vessel contents were diluted with 300 ml. of standard formulation water and subjected to an additional mixing at 700 rpm for 5 minutes, and then the such vessel contents were also transferred to the screen. The on-screen rinses were reduced to three, and otherwise the separations and recovery were as described in the Simulated De-oiling Method. The oil content of the recovered sludge was 5.6 weight percent.

EXAMPLES 8 to 11

Four mill sludge samples were processed according to the Simulated De-oiling Method, except that the combined mill sludge sample and dilution water charged to the mixing vessel was increased to about 700 grams (because a greater volume was required to cover fully the impeller with this vessel) and 850 ml. of water was used for the rinses of the material transferred to the Buchner funnel. The amounts and types of surfactants used are set forth in Table 4 below together with the results.

TABLE 4

|  | Example No. | | | |
| --- | --- | --- | --- | --- |
|  | 8 | 9 | 10 | 11 |
|  | | Surfactant | | |
|  | C | D | E | C |
| Level of Surfactant (ppm) | 40,000 | 40,000 | 40,000 | 50,000 |
| Percent Sludge Recovered (wt. %) | 74.3 | 83.3 | 81.1 | 70.6 |
| Oil Content of the Recovered Sludge (wt. %) | 5.85 | 9.34 | 8.01 | 4.60 |

EXAMPLES 12 to 17

Six mill sludge samples were processed according to the Simulated De-oiling Method, employing in each instance 50,000 ppm of surfactant C, except that the combined sludge and dilution water was about 700 grams for each, 850 ml. of water was used for the final rinses, and the temperature of the vessel contents was varied for each, as set forth in Table 5 below together with the results. Further, for Example 17 about twice as many post-agitation rinses were required to separate the oil emulsion from the solids eventually recovered.

TABLE 5

|  | Example No. | | | | | |
| --- | --- | --- | --- | --- | --- | --- |
|  | 12 | 13 | 14 | 15 | 16 | 17 |
| Agitation Temp. (°C. ± 1° C.) | 23 | 33 | 43 | 53 | 63 | 73 |
| Percent Sludge Recovered (wt. %) | 87.8 | 85.9 | 86.7 | 76.0 | 68.2 | 62.6 |
| Oil Content of the Recovered Sludge (wt. %) | 8.46 | 7.72 | 8.48 | 5.87 | 5.77 | 1.95 |

EXAMPLES 18 to 21

Four mill sludge samples were treated according to the Simulated De-oiling Method described above, employing surfactant C, except that the combined sludge and dilution water were about 700 grams, 850 ml. of water was used for the final rinses, and in Examples 18 and 20 the surfactant was added neat to the mill sludge sample and admixed therewith before the addition of the dilution water to the beaker. Further, the mill sludge samples and dilution water together were about 700 grams, and 850 ml. of water was used for the final rinsing. The results, together with the level of surfactant C employed, are set forth below in Table 6.

TABLE 6

|  | Example No. | | | |
| --- | --- | --- | --- | --- |
|  | 18 | 19 | 20 | 21 |
| Level of Surfactant (ppm) | 40,000 | 40,000 | 50,000 | 50,000 |
| Surfactant Added Neat to Sludge | yes | no | yes | no |
| Percent Sludge Recovered | 71.2% | 73.6% | 66.9% | 75.9% |
| Oil Content of the Recovered Sludge | 5.09% | 6.38% | 4.18% | 5.56% |

EXAMPLES 22 and 23

Two mill sludge samples were treated according to the Simulated De-oiling Method described above, employing 30,000 ppm of surfactant C, except that the combined sludge and dilution water were about 700 grams, and in Example 22 the dilution was to 67% solids instead of 50% solids. The results are set forth below in Table 7.

TABLE 7

|  | Example No. | |
| --- | --- | --- |
|  | 22 | 23 |
| Percent Solids After Dilution | 67% | 50% |
| Percent Sludge Recovered | 56.8% | 61.4% |
| Oil Content of the Recovered Sludge | 2.09% | 3.46% |

EXAMPLES 24 to 26

Twelve mill sludge samples were treated in three series according to the Simulated D--oiling Method described above, with the following exceptions as to method. For each of the three series (Examples 24, 25 and 26), an initial mill sludge sample was treated using 50,000 ppm of surfactant C. and the standard formulation water for the dilution and rinses. After the agitation processing for each, the fluid was decanted off the solid material and centrifuged to remove entrained fines, and then such fluid was used as the dilution water for the next mill sludge sample treated in the respective series. After the initial sludge sample treatment of a series, the level of fresh surfactant added was severely reduced. For Example 24, only one such subsequent recycle process was conducted, while more recycle processes were conducted for Examples 25 and 26. The results of each of these series, and the levels of fresh surfactant added, are set forth below in Tables 8 to 10.

TABLE 8

|  | Sludge Sample | |
| --- | --- | --- |
|  | Initial | First Recycle |
| Charge of Fresh Surfactant C (ppm) | 50,000 | 5,000 |
| Percent Recovered Sludge | 57.1% | 62.8% |
| Oil Content of the Recovered Sludge | 2.5% | (very high) |

TABLE 9

|  | Sludge Sample | | | |
| --- | --- | --- | --- | --- |
|  | Initial | First Recycle | Second Recycle | Third Recycle |
| Charge of Fresh Surfactant C (ppm) | 50,000 | 8,000 | 8,000 | 8,000 |

TABLE 9-continued

| | Sludge Sample | | | |
|---|---|---|---|---|
| | Initial | First Recycle | Second Recycle | Third Recycle |
| Percent Recovered Sludge | 60.0% | 66.7% | 62.4% | 62.9% |
| Oil Content of the Recovered Sludge | 2.50% | 7.79% | 5.33% | 6.69% |

TABLE 10

| | Sludge Sample | | | | | |
|---|---|---|---|---|---|---|
| | Initial | First Recycle | Second Recycle | Third Recycle | Fourth Recycle | Fifth Recycle |
| Charge of Fresh Surfactant C (ppm) | 50,000 | 10,000 | 10,000 | 10,000 | 10,000 | 10,000 |
| Percent Recovered Sludge | 52.4% | 54.4% | 56.2% | 57.4% | 61.9% | 59.3% |
| Oil Content of the Recovered Sludge | 1.51% | 1.78% | 3.21% | 2.74% | 5.14% | 4.81% |

EXAMPLES 27 to 30

Four mill sludge samples were treated according to the Simulated De-oiling Method described above, employing 50,000 ppm of surfactant C, except for each the dilution water was preheated to 80° C., and for Examples 27 and 28 the four 200 ml. on-screen rinses were conducted using water heated to between 60° and 70° C., while for Examples 29 and 30 room temperature rinses, as normal, were used. The results are set forth below in Table 11.

TABLE 11

| | Example No. | | | |
|---|---|---|---|---|
| | 27 | 28 | 29 | 30 |
| Rinse Temperature (°C.) | 60–70 | 60–70 | room T. | room T. |
| Percent Recovered Sludge | 50.1% | 50.6% | 54.9% | 53.8% |
| Oil Content of the in Recovered Sludge | 2.65% | 2.55% | 2.50% | 2.54% |

EXAMPLE 31

A mill sludge sample was treated according to the Simulated De-oiling Method described above, employing 50,000 ppm of surfactant C, except that the dilution water was preheated to 80° C., after the agitation process the beaker contents were allowed to settle for about five minutes and then the upper fluids were decanted off, and the decant and first rinse fluids were centrifuged for 20 minutes at 2,000 rpm. The percent of sludge recovered was 50.8% and had an oil content of 3.76%. The centrifuging process separated the decant and first rinse fluids into an "emulsion phase" and a "solids phase", although it is believed that the emulsion phase still contained fines. The solids phase was determined to contain 10.1 weight percent water and 30.79 weight percent oil.

Unless indicated otherwise, all of the percentages stated above are percentages based on weight.

The pH of the water and slurries used in the above process should range between a pH of about 2 to a pH of about 14, preferably between a pH of about 4 to a pH of about 12, and more preferably between a pH of about 5 to a pH of about 10.

INDUSTRIAL APPLICABILITY OF THE INVENTION

The present invention is applicable to the steel mill industry, to the industrial waste disposal industry and other related industries.

We claim:

1. A process for de-oiling mill sludge comprising:
   (a) admixing mill sludge with a sufficient amount of water and a sufficient amount of surface active agent to provide a slurry having at least 25 weight percent solids content and at least 4,000 ppm of surface active agent based on solids;
   (b) subjecting said slurry to high shear agitation to form an oily water emulsion;
   (c) separating at least 40 weight percent of said solids from said oily water emulsion; and
   (d) optionally repeating steps (a), (b) and (c) using as at least a portion of said mill sludge said solids separated from said oily water emulsion in step (c).

2. The process of claim 1 wherein at least a portion of said water and/or said surface active agent is derived from the fluid portion of another process according to claim 1 subsequent to the high shear agitation of step (b) thereof.

3. The process of claim 1 wherein said mill sludge contains at least 5.0 parts by weight oil per hundred parts by weight of solids, and at least 20.0 weight percent fines based on total mill sludge solids.

4. The process of claim 1 wherein said solids according to step (c) thereof, as substantially dry recovered sludge, contain no more than 10 weight percent oil.

5. The process of claim 1 wherein said solids separated according to step (c) thereof have an oil to total solids weight ratio that is no more than 60 percent of the oil to total solids weight ratio of said mill sludge of step (a) thereof.

6. The process of claim 1 wherein at least 50 weight percent of the solids of said mill sludge of step (a) thereof are separated in step (c) thereof.

7. The process of claim 1 wherein no more than 70 weight percent of the fines present in said mill sludge of step (a) thereof are lost to said solids separated in step (c) thereof.

8. The process of claim 1 wherein said slurry of step (a) thereof contains at least 10,000 ppm of surface active agent based on solids.

9. The process of claim 1 wherein said surface active agent is a nonionic surfactant or blend of nonionic surfactants having an HLB or HLB's within the range of from about 6 to about 20.

10. The process of claim 1 wherein said surface active agent is a nonionic surfactant or blend of nonionic surfactants having an HLB or combined weight average HLB of from about 10 to about 15.

11. A process for de-oiling mill sludge comprising:

(1) optionally analyzing mill sludge for oil and/or solids content(s);

(2) slurrying said mill sludge with water and a surface active agent to provide a mill sludge slurry having at least 25 weight percent solids content and at least 4,000 ppm of surface active agent based on the weight of the solids therein;

(3) subjecting said mill sludge slurry to high shear agitation;

(4) substantially separating the fluid phase form the solid phase of the post-agitation mill sludge slurry, optionally diluting said post-agitation mill sludge slurry with water before and/or during said separation;

(5) rinsing said solid phase recovered in step (4);

(6) optionally subjecting the fluid separated in step (4) to further phase separation to remove therefrom at least portion of the lines and oil said fluid may contain and recycling said post-phase-separation fluid back to step (2) for use as at least a portion of said water and/or said surface active agent;

(7) optionally recycling said rinse phase used in step (5) back to step (2) for use as at least a portion of said water and/or said surface active agent; and (8) optionally recycling at least a portion of said solid phase separated in step (4) back to step (1) or step (2) to be used as at least a portion of said mill sludge.

12. The process of claim 11 wherein said high shear agitation of step (3) is conducted at a temperature of from about 10° to about 80° C.

13. The process of claim 11 wherein said mill sludge slurry of steps (2) and (3) has a surface active agent content of from about 10,000 to about 70,000 parts by weight per 1,000,000 parts by weight of solids in said mill sludge slurry.

14. The process of claim 11 wherein said surface active agent is a blend of nonionic surface active agents having a combined weight average HLB of from about 10 to about 15.

15. The process of claim 14 wherein at least one of said surface active agents in said blend has an individual HLB outside of said combined weight average HLB range of from about 10 to about 15.

16. The process of claim 11 wherein said mill sludge of steps (1) and (2) has a fines content of at least 20 weight percent based on total solids in said mill sludge.

17. The process of claim 11 wherein said mill sludge of steps (1) and (2) has an oil content of at least 10.0 parts by weight of oil per hundred parts by weight of solids.

18. The process of claim 11 wherein said solid phase of step (5), as substantially dry recovered sludge, contains no more than 10 weight percent oil.

19. The process of claim 11 wherein said solid phase of step (5), as substantially dry recovered sludge, contains no more than 5 weight percent oil.

20. The process of claim 11 wherein the solids of said mill sludge of steps (1) and (2) is at least weight percent iron oxide (as FeO).

* * * * *

UNITED STATES PATENT AND TRADEMARK OFFICE
CERTIFICATE OF CORRECTION

PATENT NO. : 5,125,966
DATED : June 30, 1992
INVENTOR(S) : K. S. Siefert and N. R. Blake It is certified that error appears in the above-identified patent and that said Letters Patent is hereby corrected as shown below:

In column 2, line 55, delete "mil" and substitute therefor -- oil --.

In column 10, line 8, delete "an" substitute therefor -- and --.

In column 11, line 40, delete "5.6" and substitute therefor -- 35.6 --.

In column 11, line 46, delete "tation(s" and substitute therefor -- tation(s) --.

In column 14, line 36, delete "D-oiling" and substitute therefor -- De-oiling --.

In Claim 4, line 1, column 16, line 42, after "solids", insert -- separated --.

In Claim 11, column 17, line 21, after "least", insert -- a --.

In Claim 11, column 17, line 21, delete "lines" and substitute therefor " fines ".

UNITED STATES PATENT AND TRADEMARK OFFICE
CERTIFICATE OF CORRECTION

PATENT NO. : 5,125,966
DATED : June 30, 1992
INVENTOR(S) : K.S.Siefert, et. al.

It is certified that error appears in the above-indentified patent and that said Letters Patent is hereby corrected as shown below:

In Claim 20, column 18, line 31, after "least", insert -- 65 --.

Signed and Sealed this

Seventeenth Day of August, 1993

Attest:

BRUCE LEHMAN

Attesting Officer

Commissioner of Patents and Trademarks